United States Patent [19]

Paar

[11] Patent Number: 4,990,579
[45] Date of Patent: Feb. 5, 1991

[54] REACTION OF 2° BETA-HYDROXYALKLAMINE WITH POLYISOCYANATE TO PRODUCE (POLY)-2-HYDROXYALKYLUREA CROSSLINKER

[75] Inventor: Willibald Paar, Graz, Austria

[73] Assignee: Vianova Kunstharz, A.G., Werndorf, Austria

[21] Appl. No.: 287,072

[22] Filed: Dec. 21, 1988

[30] Foreign Application Priority Data

Dec. 21, 1987 [AT] Austria ................................ 3372/87

[51] Int. Cl.$^5$ ....................... C08L 63/02; C08G 59/40
[52] U.S. Cl. ................................... 525/528; 523/415; 528/45
[58] Field of Search ......................................... 525/528

[56] References Cited

U.S. PATENT DOCUMENTS

| | | | |
|---|---|---|---|
| 4,260,727 | 4/1981 | Floyd | 523/414 |
| 4,356,276 | 10/1982 | Hönig et al. | 525/528 |
| 4,376,687 | 3/1983 | Miyake et al. | 525/111 |
| 4,522,986 | 6/1985 | Short et al. | 525/458 |
| 4,777,225 | 10/1988 | Paar | 525/528 |
| 4,837,291 | 6/1989 | Paar | 525/504 |

FOREIGN PATENT DOCUMENTS 1303480  1/1973 United Kingdom .

Primary Examiner—Lewis T. Jacobs
Assistant Examiner—Robert E. L. Sellers, II
Attorney, Agent, or Firm—A. W. Breiner

[57] ABSTRACT

Crosslinking cationic paint binders, preferably cathodically depositable paint binders comprising (poly)-2-hydroxyalkylurea compounds as a crosslinking agent are described. The 2-hydroxyalkylureas are obtained by reacting organic polyisocyanates with secondary beta-hydroxyalkylamines. The crosslinking agents of the invention permit film formation in the stoving range of about 140° C., which is particularly favorable for water-based paints. Additionally, selective semi-blocking which is made possible through the difference in reactively between the NCO-groups of individual polyisocyanates is enhanced through use of the secondary amino groups, in comparison to through use of hydroxyl groups which are conventionally used.

10 Claims, No Drawings

REACTION OF 2° BETA-HYDROXYALKLAMINE WITH POLYISOCYANATE TO PRODUCE (POLY)-2-HYDROXYALKYLUREA CROSSLINKER

FIELD OF INVENTION

The present invention relates to the crosslinking of cationic paint binders. More particularly, the invention relates to crosslinking cationic paint binders, preferably cathodically depositable paint binders, by means of (poly)-2-hydroxyalkylurea compounds as the crosslinking agent.

BACKGROUND OF INVENTION

It is known to crosslink cationic paint binders of the type primarily used for electrodeposition paints at elevated temperatures with blocked polyisocyanate compounds. The crosslinking component can be present in the form of a blocked polyisocyanate compound in admixture with the main paint binder, as described, for example, in DE-OS 20 57 799. However, the blocked isocyanate groups can also be formed by reacting semiblocked diisocyanates with the corresponding functional groups of the binder. In such cases, self-crosslinking binders are obtained as described, for example, in DE-OS 22 52 536. The blocking agents used in most cases are aliphatic monoalcohols, particularly 2-ethylhexanol, but also glycol monoethers or low molecular weight alcohols, such as methanol or ethanol as described, for example, in the above-mentioned DE-OS 22 52 536 or EP-A-192 113. The unblocking temperature in all cases is relatively high and cannot be brought down below 170° C. even when catalysts are used.

In another group of crosslinking components, film formation is effected by transesterification or transamidation or with poly-beta-hydroxyalkylester compounds such as beta-hydroxyalkyesters, as described in EP-A-131 125; beta-amidoalkylesters, as described in DE-A-32 24 864; or carbalkoxymethylesters, as described in EP-A-102 501, with the hydroxyl or amino groups of the binder partner. In these cases, too, a stoving temperature of at least 160° C. is essential to ensure adequate crosslinking. Furthermore, the cured films contain substantial amounts of hydrolyzable ester groups, resulting in a reduction in the corrosion resistance of the films.

GENERAL DESCRIPTION OF INVENTION

It has been found according to the present invention that cationic binders can be crosslinked at temperatures as low as 140° C. to form coatings with excellent properties, including corrosion resistance, if blocked isocyanate groups in the form of 2-hydroxyalkylureas are used for the crosslinking reaction. Accordingly, the invention relates to a process for crosslinking cationic paint binders, particularly of cathodically depositable paints, by means of blocked isocyanate groups and then splitting off the blocking agent at elevated temperature characterized in that the crosslinking component is a 2-hydroxyalkylurea obtained by complete or partial reaction of an organic polyisocyanate compound, such as a diisocyanate, with a secondary beta-hydroxyalkylamine. Optionally, the isocyanate groups which remain free after partial reaction are reacted with NCO-reactive groups of the binder partner to form a self-crosslinking binder.

The invention further relates to cationic paint binders which contain isocyanate compounds blocked with secondary beta-hydroxyalkylamines as the crosslinking component in admixture or as a partial reaction product with a paint binder partner.

The crosslinking agents of the invention not only make it possible to effect film formation in the stoving range of about 140° C., which is particularly favorable for water-based paints, but also permit more selective semiblocking as a result of the difference in reactivity between the NCO-groups of individual polyisocyanates with the secondary amino groups, which is more selective in comparison to hydroxyl groups as are conventionally used.

The 2-hydroxyalkylureas used according to the present invention are obtained by reacting organic polyisocyanates, such as the diisocyanates, with secondary betahydroxalkylamines. For crosslinking components which are added to a paint binder partner in the form of totally blocked polyisocyanates, it is possible to use any conventional diisocyanates or triisocyanates, as well as the prepolymers of these compounds with polyols. Any of the large numbers of aliphatic and aromatic di-, tri-, and polyisocyanates which are commercially obtainable under various brand names can be used. In order to incorporate crosslinking functionality to produce self-crosslinking binders, diisocyanates having isocyanate groups with different degrees of reactivity are preferably used to form partially blocked isocyanate compounds. Isophorone diisocyanate and 2,4-toluene diisocyanate are preferred for this purpose. It is, of course, also possible to use the standard commercial isomeric mixture of the latter with an approximately 20% content of 2,6-toluene diisocyanate.

The secondary beta-hydroxyalkylamines which are suitable for reaction with the polyisocyanate include, for example, the N-alkylalkanolamines, such as N-methylethanolamine, and the homologues thereof. It is also possible to use reaction products of monoepoxide compounds, such as glycidylesters or glycidylethers, with primary amines. The beta-hydroxyalkylamines should preferably be volatile at the unblocking temperature. Non-volatile blocking agents may have beneficial effects on the film-forming characteristics in some cases, but they must not have a negative effect on the qualities of film resistance.

The blocking of the NCO-groups with secondary betahydroxyalkylamines to form the 2-hydroxyalkylureas is effected at temperatures of 10° C. and upwards. Total blocking is preferably carried out at from about 30° C. to about 40° C. For partial blocking, temperatures of from about 10° C. to about 25° C. are preferred. The reaction preferably takes place in the presence of a reaction-inert solvent, such as methylisobutylketone or a glycoldiether.

Fully blocked crosslinking components are used according to this invention in a ratio of from about 15% to about 40% by weight, based on the total binder. In the case of self-crosslinkng binders, the proportion of 2-hydroxyalkylurea groups must ensure adequate crosslinking after the unblocking.

Polyaddition, polycondensation, and polymerization products carrying nitrogen-basic groups are suitable for use as the main component of the binder or binder combination of the present invention. Any of the large number of commercially available materials can be used. The selection criteria is only that a sufficient number of NCO-reactive groups are present in such binders to ensure reaction.

The paint binder combinations are made water-soluble by at least partial salt formation with acids and are optionally processed with pigments, extenders, and other paint additives in known manner and as is conventional.

The paint binder combinations which contain the crosslinking components used according to the present invention advantageously contain crosslinking catalysts, preferably organic lead compounds such as lead octoate or lead naphthenate. For use in the electrodeposition painting process, the paints are produced in the usual form. If a separate crosslinking component is used, it is advantageously added before dilution with water is carried out.

PRESENTLY PREFERRED EMBODIMENTS

The following example is set forth to illustrate the invention without restricting its scope. All the parts or percentages given are units by weight unless otherwise stated.

EXAMPLE

In a suitable reaction vessel, 863 parts of a 70% solution in diethyleneglycol of a toluene diisocyanatetrimethylolpropane prepolymer in a molar ratio of 2.7:1 are reacted with 203 parts (2.7 mole) of methylethanolamine at from about 30° C. to about 40° C. until the NCO-groups are completely reacted. 30 parts (100% solids) of the obtained crosslinking component are mixed with 70 parts (100% solids) of a modified cationic epoxy resin as described below and mixed with 1% lead in the form of lead octoate. After the addition of 45 mMole of formic acid per 100 g of solids, a clear lacquer with a solids content of 15% by weight is produced by dilution with deionized water.

A cathodically deposited film of the obtained clear lacquer is stoved for 30 minutes at 140° C. The resulting lacquer film has a resistance to methylethylketone of about 400 double strokes for a dry film thickness of 20±2 microns.

In comparison, when 2-ethylhexanol is used as the blocking agent instead of the blocking according to the present invention, an equivalent resistance is only achieved when using a stoving temperature of 185° C.

The modified cationic epoxy resin used in this example is produced as follows: 500 parts of an epoxy resin based on bisphenol A and epichlorohydrin having an epoxide equivalent weight of about 500 are dissolved in 214 parts of propyleneglycol monomethylether and reacted at 110° C. with 83 parts of a hemiester of phthalic acid anhydride and 2-ethylhexanol in the presence of 0.5 g of triethylamine as catalyst until an acid number of less than 3 mg KOH/g is obtained. Then 120 parts of an NH-functional oxazolidine which is the reaction product of aminoethylethanolamine, 2-ethylhexylacrylate, and formaldehyde are added, together with 26 parts of diethylaminopropylamine; and the mixture is reacted at 80° C. until an epoxy value of substantially zero is obtained. The mixture is diluted with 200 parts of propyleneglycol monomethylether.

As will be apparent to one skilled in the art, various modifications can be made within the scope of the aforesaid description. Such modifications being within the ability of one skilled in the art form a part of the present invention and are embraced by the appended claims.

It is claimed:

1. Cationic paint binders comprising in combination a (poly)-2-hydroxyalkylurea crosslinking agent which is the reaction product of an organic polyisocyanate blocked with a secondary beta-hydroxyalkylamine and having reactive -NCO functional groups at temperatures of as low as 140° C., and a paint binder carrying nitrogen-basic groups and having functional groups reactive at said temperatures with said -NCO functional groups.

2. The cationic paint binders of claim 1 wherein said polyisocyanate is a diisocyanate.

3. The cationic paint binders of claim 2 wherein said diisocyanate is only partially reacted with said secondary beta-hydroxyalkylamine.

4. The cationic paint binders of claim 2 wherein said diisocyanate is completely reacted with said secondary beta-hydroxyalkylamine.

5. The cationic paint binders of claim 1 wherein said beta-hydroxyalkylamine is a N-alkylalkanolamine.

6. The cationic paint binders of claim 1 wherein said beta-hydroxyalkylamine is the reaction of a mono epoxide compound with a primary amine.

7. A self-crosslinking cationic paint binder comprising a (poly)-b 2-hydroxyalkylurea crosslinking agent which is an organic polyisocyanate partially blocked with a secondary beta hydroxyalkylamine, with the free isocyanate groups of said polyisocyanate being reacted with a paint binder carrying nitrogen-basic groups and having functional groups reactive with said free isocyanate groups.

8. The self-crosslinking cationic paint binder of claim 7 wherein sad polyisocyanate is a diisocyanate.

9. The self-crosslinking cationic paint binder of claim 7 wherein said beta-hydroxyalkylamine is a N-alkylalkanolamine.

10. The self-crosslinking cationic paint binder of claim 7 wherein said beta-hydroxyalkylamine is the reaction of a mono-epoxide compound with a primary amine.

* * * * *